US010392086B2

(12) United States Patent
Trigui et al.

(10) Patent No.: US 10,392,086 B2
(45) Date of Patent: Aug. 27, 2019

(54) WIRELESSLY CONTROLLED SUBSYSTEMS FOR UNDERWATER REMOTELY OPERATED VEHICLES

(71) Applicant: Saudi Arabian Oil Company, Dhahran (SA)

(72) Inventors: Hassane Trigui, Thuwal (SA); Sahejad Patel, Thuwal (SA); Ali Outa, Thuwal (SA); Ayman Amer, Thuwal (SA); Fadl Abdellatif, Thuwal (SA); Ameen Obedan, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 324 days.

(21) Appl. No.: 15/248,827

(22) Filed: Aug. 26, 2016

(65) Prior Publication Data

US 2018/0057127 A1    Mar. 1, 2018

(51) Int. Cl.
*B63G 8/00* (2006.01)
*B63G 8/39* (2006.01)
(Continued)

(52) U.S. Cl.
CPC ............... *B63G 8/001* (2013.01); *B63G 8/39* (2013.01); *G05D 1/0022* (2013.01); *G08C 17/02* (2013.01);
(Continued)

(58) Field of Classification Search
None
See application file for complete search history.

(56) References Cited

U.S. PATENT DOCUMENTS 5,995,882 A    11/1999    Patterson et al.
7,007,625 B2   3/2006    Shelton
(Continued)

OTHER PUBLICATIONS

International Search Report and Written Opinion for International Patent Application No. PCT/US2017/046939 dated Nov. 20, 2017. 12 pages.
(Continued)

*Primary Examiner* — Jelani A Smith
*Assistant Examiner* — Kelly D Williams
(74) *Attorney, Agent, or Firm* — Leason Ellis LLP

(57) ABSTRACT

A system for underwater remotely operated vehicles (ROVs) and wirelessly controlled subsystems is provided. The system comprises an ROV and a subsystem mounted to the ROV. The ROV includes a microcontroller, a main battery, and a transmitter-receiver. The subsystem includes a controller and a transmitter-receiver. The ROV is configured to communicate wirelessly with the subsystem via signals transmitted between the ROV transmitter-receiver and the subsystem transmitter-receiver. The system can further comprise a control center having a transmitter-receiver configured to communicate wirelessly with the ROV transmitter-receiver and the subsystem transmitter-receiver. The system can further comprise at least one relay module configured to relay signals between the transmitter-receivers of the system. The ROV of the system can also be configured to wirelessly transfer power from the main battery to the power source of the subsystem, such as by resonance coupling.

23 Claims, 5 Drawing Sheets

(51) Int. Cl.
*G08C 17/02* (2006.01)
*H04B 5/00* (2006.01)
*G05D 1/00* (2006.01)

(52) U.S. Cl.
CPC ..... *H04B 5/0037* (2013.01); *B63G 2008/005* (2013.01)

(56) References Cited

U.S. PATENT DOCUMENTS

| | | |
|---|---|---|
| 2003/0167998 A1 | 9/2003 | Huntsman |
| 2008/0041293 A1* | 2/2008 | Diorio ..................... B63B 3/08 114/312 |
| 2009/0114140 A1 | 5/2009 | Guerrero et al. |
| 2010/0107958 A1* | 5/2010 | Rhodes .................. F42B 19/01 114/312 |
| 2012/0257704 A1 | 10/2012 | Asada et al. |
| 2014/0224167 A1* | 8/2014 | Gasparoni ............... B63C 11/52 114/321 |
| 2014/0232200 A1 | 8/2014 | Maekawa |
| 2016/0121009 A1 | 5/2016 | Farr et al. |
| 2016/0325809 A1* | 11/2016 | Williams ............... B63G 8/001 |

OTHER PUBLICATIONS

International Preliminary Report on Patentability for International Patent Application No. PCT/US2017/046939 dated Sep. 11, 2018. 12 pages.

\* cited by examiner

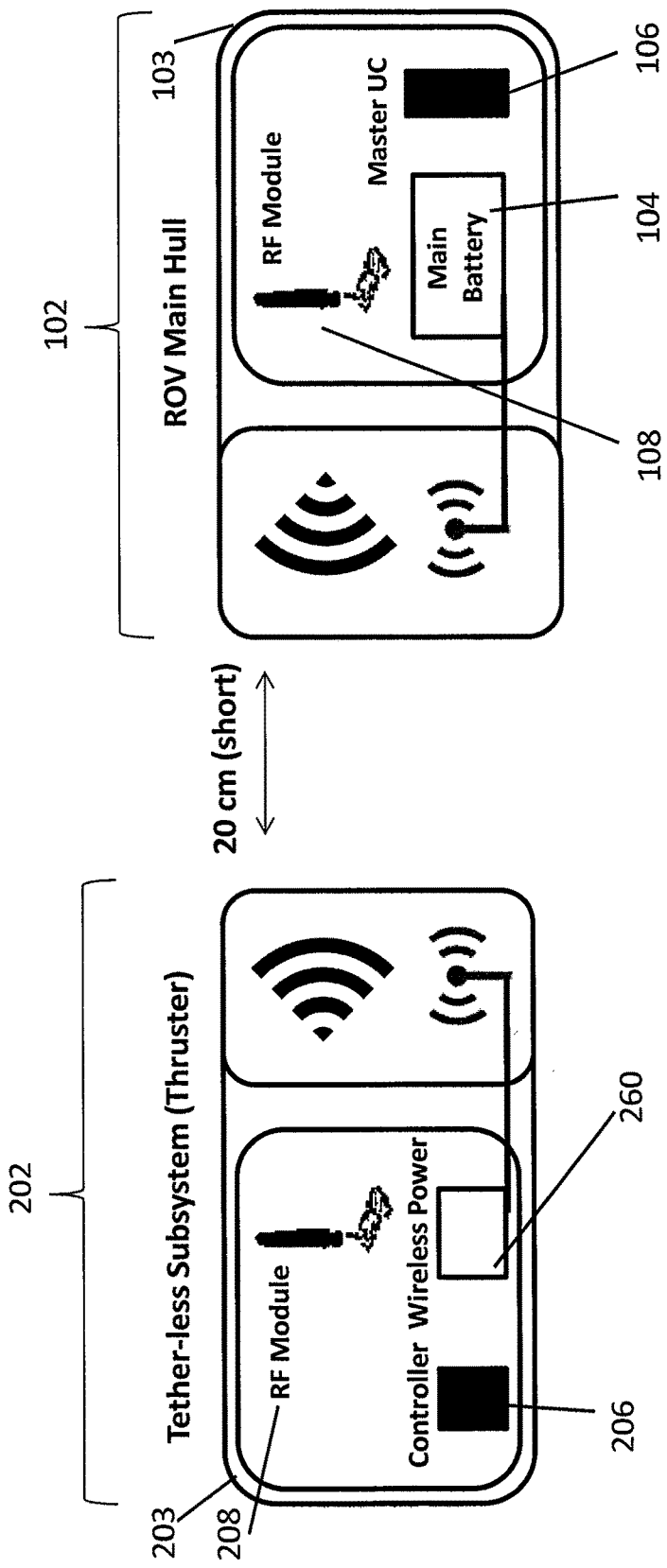

WIRELESSLY CONTROLLED SUBSYSTEMS FOR UNDERWATER REMOTELY OPERATED VEHICLES

FIELD OF THE INVENTION

The present disclosure relates to methods and systems for underwater remotely operated vehicles and wireless subsystems of the remotely operated vehicles.

BACKGROUND OF THE INVENTION

Underwater remotely operated vehicles (ROVs) are unmanned robots that have many marine applications including inspection and maintenance of industrial infrastructure. Before ROVs, in order to inspect an underwater infrastructure (e.g., underwater pipelines), human divers were used; however, using divers raises safety concerns and is expensive. As such, ROVs eliminate many of the safety and financial concerns associated with divers.

Underwater ROVs are usually composed of certain components that need to be enclosed and sealed from water, and others that are required to operate in the water. For instance, ROVs typically include a main hull that comprises a motherboard with an electrical circuit (e.g., microcontroller) that controls the vehicle and a main battery that feeds power to the vehicle. The motherboard and main battery are sealed and enclosed within the main hull. Multiple subsystems that need to operate in the water can be mounted around the outside of the ROV. These subsystems can include actuators, motors, instruments, lights, non-destructive testing (NDT) modules, and the like. The subsystems are mounted to the ROV via tethers to communicate with the master microcontroller and receive power from the main battery. However, the presence of tethers on the ROV creates turbulence and unsteady flow of water around the ROV (e.g., in the hydrosphere) resulting in the decreased efficiency of the ROV's hydrodynamics. Further, the integrity of the main hull of the ROV is hampered by the sealed open holes of the connectors between the subsystems cables and the devices inside the main hull devices. The decreased integrity of the main hull also compromises the depth rating of the ROV. Additionally, ROVs are very expensive to modify due to the required sealing and firm design of the hull to accommodate the subsystems. As such, adding more features (e.g., subsystems) to an existing ROV would require extensive redesign of the vehicle.

The present invention addresses these and other limitations associated with conventional underwater ROVs and inspection protocols.

SUMMARY OF THE INVENTION

According to an aspect of the present invention, there is provided a system for underwater remotely operated vehicles (ROVs) and wirelessly controlled subsystems, which includes an ROV and a subsystem. The ROV includes a main hull, which encloses a microcontroller, a main battery, and at least one ROV transmitter-receiver. The subsystem is mounted to the main hull and includes a housing, a controller, and at least one subsystem transmitter-receiver, where the housing encloses the controller and the at least one subsystem transmitter-receiver. The ROV is configured to communicate wirelessly with the subsystem via signals transmitted between the at least one ROV transmitter-receiver and the at least one subsystem transmitter-receiver.

In one or more implementations, all power and communication is through a tether-less coupling that is free of any openings in either the main hull or any subsystem. According to another aspect of the present invention, the system further comprises a control center having at least one station transmitter-receiver. The control center is configured to communicate wirelessly with the ROV and the subsystem via signals between the at least one station transmitter-receiver, the at least one ROV transmitter-receiver, and the at least one subsystem transmitter-receiver. According to a further aspect, the control center is configured to control the operation of the ROV and subsystems via control signals between the at least one station transmitter-receiver, the at least one ROV transmitter-receiver, and the at least one subsystem transmitter-receiver.

According to another aspect of the present invention, the system further comprises at least one relay module configured to relay the signals between the transmitter-receivers of the ROV and the subsystem.

According to another aspect of the present invention, the subsystem further comprises a battery. According to further aspect of the present invention, the ROV is configured to wirelessly transfer power from the main battery to the battery of the subsystem. According to further aspect of the present invention, the ROV further comprises a power transmitter configured to wirelessly transfer power from the main battery to the battery of the subsystem.

According to another aspect of the present invention, the system further comprises one or more power transfer repeaters configured to relay power from the main battery to the battery of the subsystem.

According to another aspect of the present invention, the system further comprises at least one additional subsystem, wherein the at least one additional subsystem comprises a battery. According to a further aspect of the present invention, the ROV further comprises a reed switch configured to control the batteries of the subsystems. The reed switch can be controlled via the application of an electric field.

According to another aspect of the present invention, the ROV further comprises a series resonator enclosed within the main hull that is configured to selectively feed power to the subsystems via magnetic resonance coupling methods.

According to another aspect of the present invention, the subsystem and additional subsystems each comprise at least one subsystem tool. According to a further aspect, the at least one subsystem tool includes at least one of a thruster, light flash, sonar, camera, servos, DC motor, linear actuator, robotic arm, joint, ultrasonic thickness testing probe, and/or cathodic protection probe, sensor, inspection tool, maintenance tool and various combinations thereof.

According to another aspect of the present invention, the subsystem further comprises a power receiver resonator. According to a further aspect, the ROV is configured to wirelessly transfer power from the main battery to the subsystem via the power receiver resonator. According to another aspect, the ROV further comprises a power transmitter configured to wirelessly transfer power from the main battery to the subsystem via the power receiver resonator. According to a further aspect, the power transmitter is configured to wirelessly transfer power from the main battery to the subsystem via the power receiver resonator using magnetic induction methods.

According to another aspect of the present invention, the at least one transmitter-receiver of the ROV comprises at least one antenna. According to a further aspect, the at least one antenna of the ROV transmitter-receiver is an omnidirectional antenna. According to another aspect, the at least one transmitter-receiver of the subsystem comprises at least one antenna. According to a further aspect, the at least one antenna of the subsystem is a directional antenna.

According another aspect of the present invention, the signals transmitted between the ROV transmitter-receiver and the subsystem transmitter-receiver are data signals and command signals. According to a further aspect, the data signals and command signals are low frequency RF signals. According to another aspect, the data signals and command signals are acoustic signals. According to another aspect, the data signals and command signals are optical signals. These and other aspects and features shall be understood from the following discussion of certain embodiments of the invention.

BRIEF DESCRIPTION OF THE DRAWINGS

FIG. 4 illustrates an example schematic of a subsystem and main hull of an underwater remotely operated vehicle including a wireless power configuration according to at least one alternative embodiment of the present application.

DETAILED DESCRIPTION CERTAIN OF EMBODIMENTS OF THE INVENTION

Figure 1:
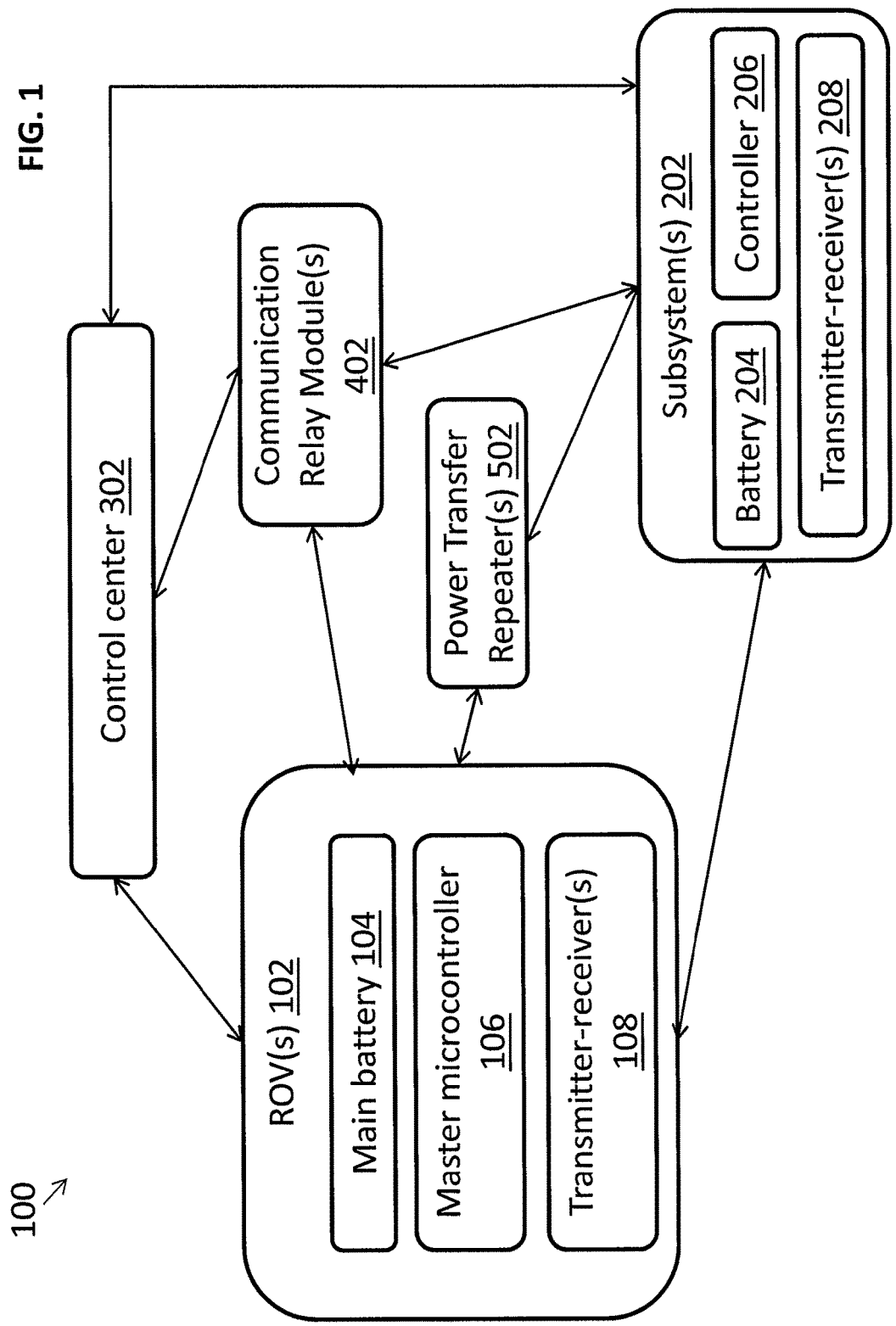
FIG. 1 is a diagram of an example system for wirelessly controlled subsystems for underwater ROVs according to at least one embodiment of the present application.

The present application details systems and methods for wirelessly controlled subsystems for underwater remotely operated vehicles (ROVs). In particular, the application discloses underwater wireless communication and power transfer techniques for ROVs, as well as subsystems operatively connected to the ROVs without a tether.

In one or more embodiments, the present system comprises at least one underwater ROV having a main hull that is free or substantially free of openings and tether-less. The system can also comprise one or more subsystems that communicate with the ROV wirelessly and can be mounted to the ROV without the use of a tether. In at least one implementation, the one or more subsystems can be self-powered (e.g., having its own on-board battery), and can seek additional power (e.g., recharging of the battery) wirelessly. In one or more embodiments, the ROV and subsystems can communicate with one another and/or with a control center via transmitters-receivers located inside the main hull of the ROV and inside the housing of each subsystem. Further, in at least one implementation, power can be transferred wirelessly from the battery of the ROV to the battery of each subsystem.

The present systems and methods provide for several advantages over previous ROV systems. For example, because the main hull of the ROV is free (or substantially free) of openings, the main hull can be composed of a harder material, which allows the ROV to withstand greater pressures and harsher environments. The present systems and methods also provide ROVs and subsystems with reduced mass and buoyancy relative to previous ROVs and subsystems that included tethers and openings in the housings. Additionally, because the present system is tether-less, the ROV and its subsystems have increased hydrodynamic efficiency and consequently decreased vehicle drag in the water. Further, because the main hull of the ROV has no openings or tethers, various subsystems can be mounted to (and demounted from) the main hull. Thus, an operator can use an ROV for various applications by seamlessly mounting and demounting various subsystems such that the ROV is suitable for one or more particular tasks. Further, because the subsystems and the ROV communicate wirelessly, new subsystems can be mounted to the ROV without the need to account for a connector. Finally, because the present system uses transmitters-receivers for wireless communication rather than wires, the subsystems and the ROV are easier to debug.

The referenced systems and methods for wirelessly controlled subsystems for underwater ROVs are now described more fully with reference to the accompanying drawings, in which one or more illustrated embodiments and/or arrangements of the systems and methods are shown. The systems and methods of the present application are not limited in any way to the illustrated embodiments and/or arrangements as the illustrated embodiments and/or arrangements are merely exemplary of the systems and methods, which can be embodied in various forms as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

FIG. 1 illustrates an exemplary system 100 for wirelessly controlled subsystems for underwater ROV. The system 100 includes one or more ROVs 102 each having one or more subsystems 202. In one or more embodiments, the system 100 can further include a control center 302, one or more communication relay modules ("relay modules") 402, and/or one or more power transfer repeaters 502 as discussed in further detail below. In one or more embodiments, each ROV can comprise a main battery 104, a master microcontroller 106, and at least one transmitter-receiver 108. Similarly, in one or more embodiments, each subsystem can comprise a battery 204, a controller 206, and at least one transmitter-receiver 208. The controllers 106, 206 and the transmitter-receivers 108, 208 comprise hardware and firmware or software.

Figure 2A:
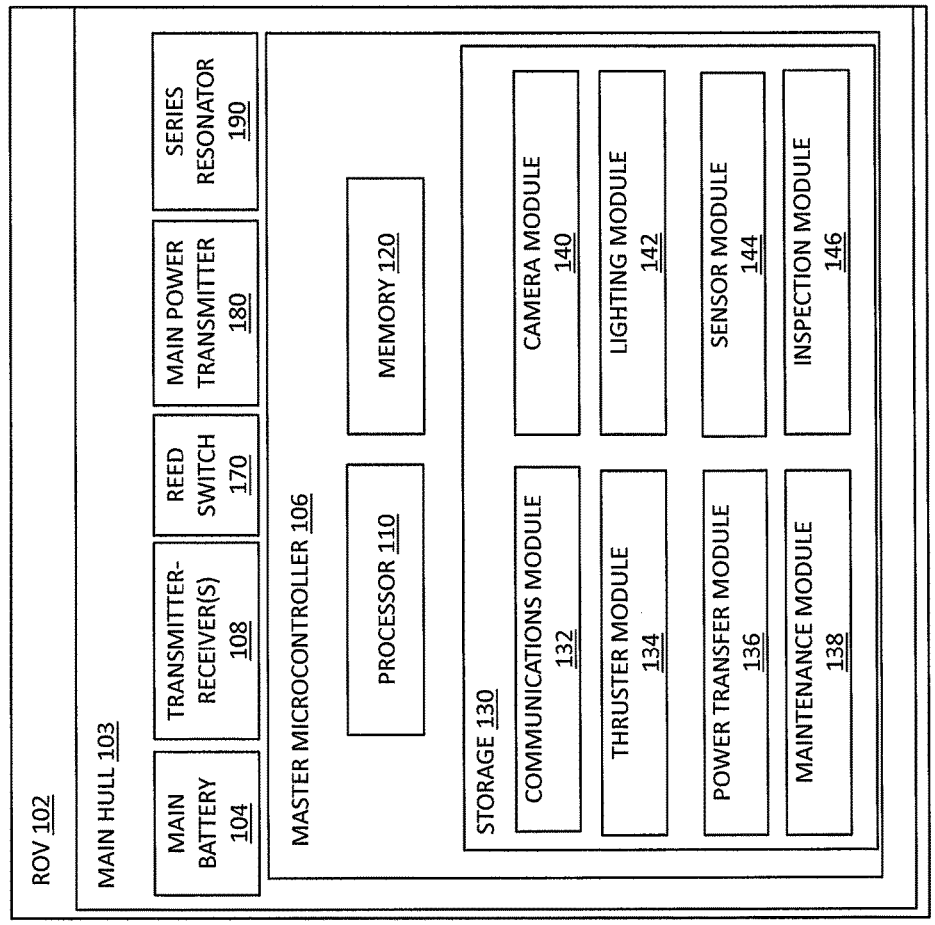
FIGS. 2A-B are block diagrams illustrating example configurations of an ROV (2A) and a subsystem (2B) according to at least one embodiment of the present application.
Figure 2B:
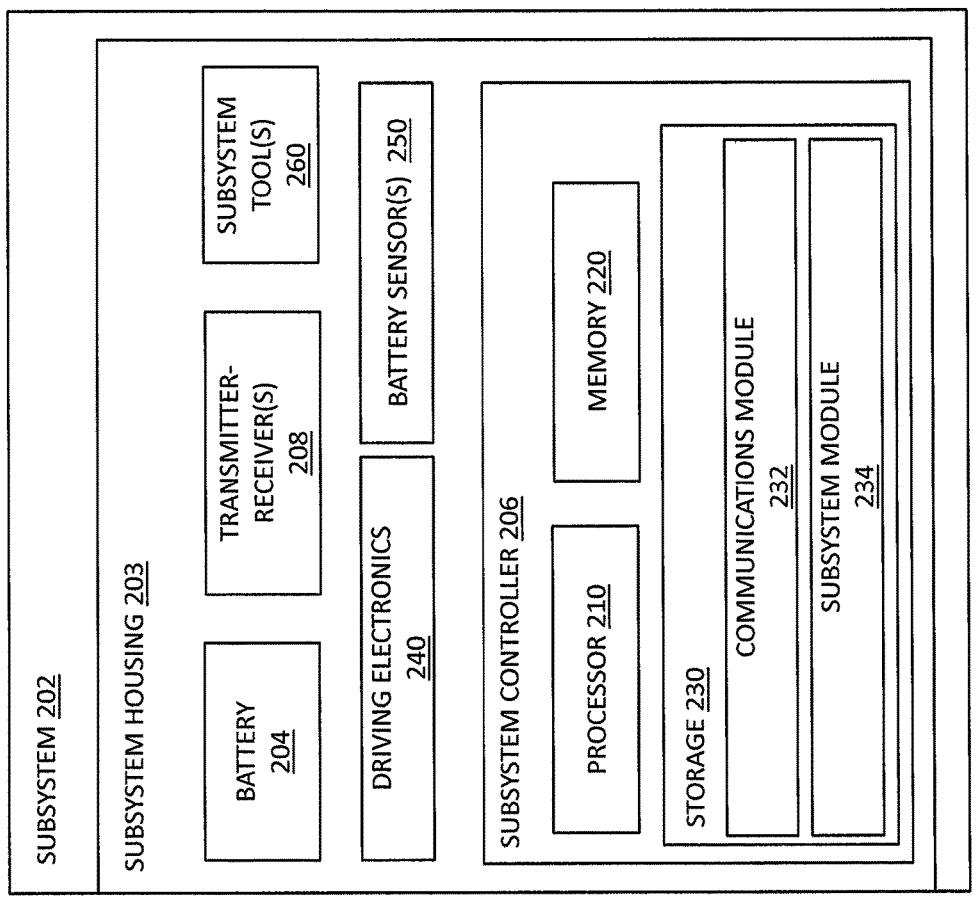

FIGS. 2A-B illustrates example configurations of an ROV 102 (FIG. 2A) and a subsystem 202 (FIG. 2B) according to at least one embodiment of the present application. In one or more embodiments, the ROV 102 is structured so that it can dive under the surface of the water and perform various maintenance and inspection operations on underwater infrastructures. Specifically, referring to FIG. 2A, the ROV 102 comprises a main hull 103 that separates the inner components of the ROV from the aquatic environment. In one or more embodiments, the main hull does not have any openings and is tether-less. In at least one embodiment, the main hull can have one or a few openings and is tether-less. In at least one embodiment, the interior of the main hull 103 is wireless. In one or more embodiments, the main hull 103 can enclose several components of the ROV 102, including a main battery 104, a master microcontroller 106, and at least one transmitter-receiver 108. In one or more embodiments, the main battery 104 is the primary power source for all operations the ROV 102, and as such the ROV 102 is self-powered. In one or more embodiments, the main battery 104 can be used to charge the batteries of the subsystems as described in further detail below. The at least one transmitter-receiver 108 can be configured to transmit signals and/or data to one or more subsystems 202 and to the control center 302. The transmitter-receiver 108 can also be configured to receive signals and/or data from the subsystems 202 and control center 302. In one or more embodiments, these signals and/or data can be transmitted between the ROV 102, subsystem 202, and control center 302 via the use of relay modules 402 as discussed in greater detail below. In one or more embodiments, the transmitter-receivers 108 can be transceivers or can be separate transmitters and receivers.

As mentioned above, the main hull 103 comprises a master microcontroller 106. The master microcontroller 106 can be arranged with various hardware and software components that serve to enable various operations of the ROV 102, including a hardware processor 110, a memory 120, and storage 130. The processor 110 serves to execute software instructions that can be loaded into the memory 120. The processor 110 can comprise a number of processors, a multi-processor core, or some other type of processor, depending on the particular implementation.

Preferably, the memory 120 and/or the storage 130 are accessible by the processor 110, thereby enabling the processor 110 to receive and execute instructions stored on the memory 120 and/or on the storage 130. The memory 120 can be, for example, a random access memory (RAM) or any other suitable volatile or non-volatile computer readable storage medium. In addition, the memory 120 can be fixed or removable. The storage 130 can take various forms, depending on the particular implementation. For example, the storage 130 can contain one or more components or devices such as a hard drive, a flash memory, a rewritable optical disk, a rewritable magnetic tape, or some combination of the above. The storage 130 also can be fixed or removable.

One or more software modules are encoded in the storage 130 (as shown in FIG. 2) and/or in the memory 120. The software modules can comprise one or more software programs or applications having computer program code or a set of instructions executed in the processor 110. Such computer program code or instructions for carrying out operations and implementing aspects of the systems and methods disclosed herein can be written in any combination of one or more programming languages. The program code can execute entirely on the ROV 102, as a stand-alone software package, partly on the ROV 102 and partly on a remote computer/device or entirely on such remote computers/devices. In the latter scenario, the remote computer systems can be connected to ROV 102 through any type of network, including a local area network (LAN) or a wide area network (WAN), or the connection can be made through an external computer (for example, through the Internet using an Internet Service Provider).

In one or more embodiments, included among the software modules can be a communications module 132, a thruster module 134, a power transfer module 136, a maintenance module 138, a camera module 140, a lighting module 142, a sensor module 144, and/or an inspection module 146 that are executed by processor 110. During execution of the software modules, the processor 110 is configured to perform various operations relating to the configuration of the ROV 102. In addition, it should be noted that other information and/or data relevant to the operation of the present systems and methods can also be stored on the storage 130, for instance various control programs used in the configuration of the ROV 102.

Similarly, in an alternative embodiment, the underwater vehicle can include a control module (in place of a master microcontroller) that can be arranged with various hardware and software components that serve to enable operation of the system, including a processor, a memory, a thruster module, a power transfer module, a maintenance module, a camera module, a lighting module, a sensor module, and/or a inspection module, and a computer readable storage medium in order to execute the various functions of the ROV.

Referring now to FIG. 2B, as mentioned above, the system 100 further comprises one or more subsystems 202. In one or more embodiments, each subsystem 203 has its own housing 203 that is completely sealed and has no openings or tethers. In other embodiments, the housing has one or a few openings that can be sealed shut. As such, the inner components of each subsystem remain completely separated from the aquatic environment. The housing 203 of each subsystem can enclose several inner components of the subsystem including a battery 204, a subsystem controller 206, and at least one transmitter-receiver 208. As with the transmitter-receiver 108 of the ROV, in certain embodiments, the transmitter-receivers 208 can be a transceiver or can be separate transmitters and receivers.

In one or more embodiments, the subsystem controller 206 can be arranged with various hardware and software components that serve to enable various operations of the particular subsystem, including a hardware processor 210, a memory 220, and storage 230. The processor 210 serves to execute software instructions that can be loaded into the memory 220. The processor 210 can be a number of processors, a multi-processor core, or some other type of processor, depending on the particular implementation.

As with the microcontroller of the ROV, the memory 220 and/or the storage 230 of each subsystem 202 are preferably accessible by the processor 210, thereby enabling the processor 210 to receive and execute instructions stored on the memory 220 and/or on the storage 230. The memory 220 can be, for example, a random access memory (RAM) or any other suitable volatile or non-volatile computer readable storage medium, and the memory 220 can be fixed or removable. Similarly, the storage 230 can take various forms, such as containing one or more components or devices such as a hard drive, a flash memory, a rewritable optical disk, a rewritable magnetic tape, or some combination of the above. The storage 230 also can be fixed or removable.

One or more software modules are encoded in the storage 230 (as shown in FIG. 2B) and/or in the memory 220, and each module can comprise one or more software programs or applications executed in the processor 210. Such software programs or applications for carrying out operations and implementing aspects of the systems and methods disclosed herein can be written in any combination of one or more programming languages. In one or more embodiments, included among the software modules can be a communications module 232 and/or a subsystem module 234, where the subsystem module 234 can comprise any software programs or applications that are specific to the operation(s) of the particular subsystem. For example, in a thruster subsystem, the subsystem module 234 can comprise a thruster application for carrying out the operations of the thrusters.

In one or more embodiments, each of the subsystems 202 is self-powered by the battery 204. In one or more embodiments, the battery 204 can be re-charged wirelessly via power transfer from the main battery 104 of the ROV 102, as discussed in greater detail below. Each of the subsystems 202 can also comprise driving electronics 240 that are operatively connected to the battery 204 and allows for the operation of the one or more tools of each subsystem (e.g., probes, maintenance tools). Further, in one or more embodiments, the subsystem 202 can further comprise one or more battery sensors 250. In one or more embodiments, the sensor(s) 250 can be enclosed with the subsystem housing 203, as shown in FIG. 2. For example, a subsystem 202 can comprise one or more voltage and current battery sensors configured to monitor the conditions of the subsystem battery 204. In at least one embodiment, a voltage and current battery sensor can also be featured in the main hull of the ROV 102 for monitoring main battery 104.

The various subsystems 202 can include one or more subsystem tools 260 including but not limited to thrusters, light flash, sonar, camera, servos, DC motors, linear actuators, robotic arms, joints, ultrasonic thickness testing probes and/or cathodic protection probes, sensors, inspection tools, and/or maintenance tools (e.g., cleaning brushes, welding probes, fluid jets). For example, a subsystem 202 can feature one or more robotic arms that are used to sense and feel underwater assets. In another example, a subsystem 202 can feature one more sensors used to measure different qualities of the underwater assets and transmit corresponding data back to the ROV 102 and/or control center 302. In embodiments in which the subsystem 202 does not have its own power source, but is powered wirelessly (e.g., via the battery of the ROV) the subsystem tools 260 can include a power receiver resonator. While the subsystem tool(s) 260 as shown in FIG. 2B are located within the subsystem housing 203, in one or more embodiments, the tool(s) 260 can be located outside of (e.g., mounted to the outside of) the subsystem housing 203, depending on the function of the tool 260.

Each of the tools 260 can be operated using driving electronics 240 that can be conventional in design, as the tools are well understood in the art and form no part of the present invention. In at least one embodiment, two or more subsystems can be combined, such that the multiple subsystems are part of the same housing. In one or more embodiments, the housing 203 of a subsystem 202 can be physically mounted to the main hull 103 of the ROV 102. For example, the subsystem 202 can be mechanically mounted to the frame of the main hull 103 using fixtures such as screws and nuts or quick mount/release latches. Such a mechanical connection has the benefit of not impacting hull integrity. In one or more embodiments, the one or more subsystems 202 can be mounted to the ROV 102 at a location on the main hull 103 that is proximate to the transmitter-receiver 108, thereby allowing for increased reliability in communication between the transmitters-receivers 108 and 208.

Transmission of Data and Control Signals

As discussed above, in one or more embodiments, wireless communication between the ROV 102 and the one or more subsystems 202 (or between separate subsystems) can be accomplished via the transmitting and receiving of signals (e.g., data, control signals) via the respective transmitter-receivers 108 and 208. In one or more embodiments, the data and/or control signals (commands) are full duplex, low bandwidth (frequency) data that is transmitted over waves, which can cross the main hull and subsystem housings and propagate in water for short distances. Lower frequency data signals propagate faster in water than high frequency signals, thus allowing for quicker, more reliable communication between subsystems and the ROV.

Signals can be exchanged between ROV and/or subsystem(s) and the control center 302 (or between multiple subsystems) using transmitter-receivers 108 and 208 and at least one transmitter-receiver operatively connected to the control center 302. In one or more embodiments, the transmitter-receivers 108 and 208, and/or the transmitter-receiver connected to the control center 302, can each comprise at least one antenna of receiving and/or transmitting the signals. In one or more embodiments, the antenna can be an omni-directional antenna, which for example can be installed within the main hull 103 of the ROV 102 and operatively connected to the master microcontroller 106 such that it is configured to broadcast signals and receive data and/or signals from the subsystem controllers 206 and the control center 302. Similarly, in one or more embodiments, a directional antenna can be installed within the housing 103 of each subsystem. In this embodiment, the directional antenna can be directed by a tilt servo towards the omni-directional antenna of the main hull 103 to enable more reliable transmission of signals between the ROV 102 and the subsystem 202. Alternatively, in at least one embodiment, an omni-directional antenna can be installed within the subsystem housing 103 and operatively connected to the subsystem controller 206 such that it is configured to broadcast signals and receive data and/or signals from the master microcontroller 106 and the control center 302.

Figure 3:
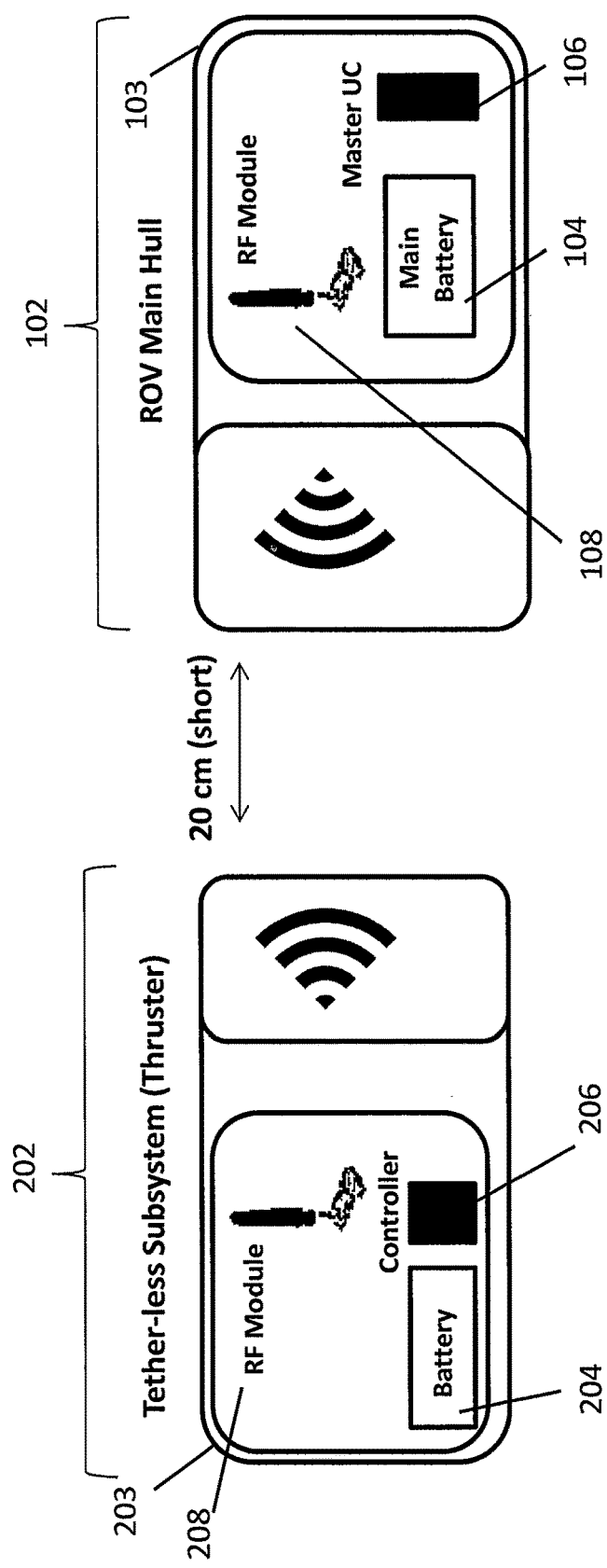
FIG. 3 illustrates an example schematic of a subsystem and main hull of an underwater remotely operated vehicle including an RF configuration according to at least one embodiment of the present application.

Various types of signals can be used for the wireless communication between the ROV, subsystems, and the control center. For example, in one or more embodiments, wireless communication is accomplished using radio frequency (RF) signals. FIG. 3 shows an example diagram of RF-based communication between the ROV 102 and a subsystem 202, each having an RF module (transmitter-receivers 108 and 208, respectively). In this embodiment, RF signals allow for short distance wireless underwater communication between the transmitter-receivers of the ROV and subsystems. For instance, in one or more embodiments, an underwater channel range of less than 20 cm in seawater allows for a data rate of 100 Mb/s, which is sufficient for control signals and telemetry data to be exchanged between the master microcontroller 106 of the ROV 102 and the subsystem controller 206.

In at least one embodiment, wireless communication can be accomplished using optical links (free space optics), such as laser-based optics or LED optics. In these embodiments, the transmitter-receivers 108 and 208 can comprise one or more nodes to enable optical communication between the ROV and the subsystem. In general, optical communication requires exact or near-exact alignment between the nodes of the ROV and the nodes of the subsystem to ensure reliable communication. As such, in an embodiment in which laser-based optics are utilized for instance, the nodes of transmitter-receiver 108 and/or transmitter-receiver 208 can be mounted on a pan and tilt motorized mechanism to better ensure exact alignment between the nodes. In at least one embodiment in which LED optics are used, multiple LED transmitter-receivers can be mounted inside the main hull 103 of the ROV 102 to ensure that signals can be transmitted at all angles around the ROV 102 and to ensure that an LED-transmitter-receiver is in close proximity with each subsystem mounted to the ROV. In embodiments in which optical link communication is used, a portion of the light propagates in water and the rest is either absorbed or scattered. As such, the main hull 103 and the subsystem housing 203 can be completely or partially made of transparent material such that there is direct line-of-sight and the propagating light rays can pass through the housings and travel through water to be detected by the transmitter-receivers 108 and 208. In at least one alternative embodiment, wireless communication can be accomplished using acoustic signals between the transmitter-receivers 108 and 208.

As such, when optical links are used, either or both the ROV 102 and the subsystem 202 include a window for enabling the optical signal to be transmitted or received, and further include active circuitry to enable adjustment, possibly on a dynamic basis, to ensure continued light-based communication. In general, for all types of wireless communication signals, minimizing the communication distance through the water is greatly advantageous as sending communication signals through water can be difficult. In particular, increasing the distance of transmission in water increases the difficulty and reduces the effectiveness of the communication. As such, as mentioned above in reference to FIG. 1, in one or more embodiments the system 100 can include one or more communication relay modules ("relay modules") 402 to extend the transmission range of the signals from the transmitter-receivers of the ROV and subsystems. In one or more embodiments, the relay modules 402 are simple modules enclosed within sealed housings and located at various distances around the ROV. For example, the one or more relay modules 402 can be located in between the ROV and a subsystem, such that a signal sent from the ROV is first received by the relay module(s) and then transmitted (forwarded) from the relay module(s) to the subsystem. In one or more embodiments, a signal originating from the ROV can be "relayed" (transmitted) from a relay module to one or more additional relay modules until it reaches the subsystem. As such, the relay modules can allow the ROV and a subsystem to be a greater total distance away from one another because the signal only has to travel a series short distances between the ROV and each relay module, before reaching the subsystem, rather than travelling one, longer distance directly from the ROV to the subsystem. Thus, in one or more embodiments, the relay modules 402 can bridge the communication distance between the ROV, subsystems, and/or control center, thus allowing them to be greater distances from one another, but still reliably communicate with one another via their respective transmitter-receivers. Further, in one or more embodiments, subsystems themselves can act as repeaters to extend the distance that data can be transmitted between the ROV, subsystems, and/or control center.

Transfer of Power

The one or more subsystems can be self-powered by their respective batteries 204, which allow the subsystems to operate autonomously for a certain period of time depending on the operations of the particular subsystem. Referring again to FIG. 2A, in one or more embodiments, the ROV 102 can further comprise a reed switch 170, which is an electrical switch that can be used to trigger the self-powered subsystems 202 (e.g., turn the subsystem batteries 204 on and off). More particularly, a reed switch 170, which can be mounted within the main hull 103 of the ROV 102, can be manipulated by applying an electric field. Thus, the application of the electric field to the reed switch 170 can configure the battery of the subsystem 204 to turn on or off.

In one or more embodiments, these subsystem batteries 204 can be re-charged via wireless power transfer. In one or more embodiments, power can be wirelessly transferred to a subsystem battery 204 from an outside power source. For example, in at least one embodiment, power can be wirelessly transferred to a subsystem battery 204 from the main battery 104 of the ROV 102. Further, in at least one embodiment, power can be wirelessly transferred through a daisy chain configuration between the various subsystems.

As discussed above, in one or more embodiments, both the ROV 102 and the one or more subsystems 202 are self-powered by a main battery 104 and a battery 204, respectively. Further, the subsystem 202 can also comprise one or more battery sensors 250 (e.g., current and voltage sensors) that monitor the conditions (e.g., power level) of the battery 204. In an exemplary embodiment, the current and voltage sensor(s) 250 can be operatively connected to processor 210 and transmitter-receiver 208 such that processor 210 is can be configured to send signals to the master microcontroller 106 (via transmitter-receiver 108) regarding the battery level. In one or more embodiments, upon receipt of a signal that the battery level of battery 204 is low, the ROV 102 can be configured to wirelessly charge the battery 204 of the subsystem 202. Specifically, in one or more embodiments, the ROV 102 can comprise a main power transmitter 180, where upon receiving a signal from the subsystem 202 regarding the level of battery 204, the power transmitter 180 can be configured to wirelessly transfer power from the main battery 104 to the subsystem battery 204. In one or more embodiments, power is transferred with the power transmitter 180 via magnetic induction methods. In this embodiment, the power transmission system is a separate system that comprises one or more source resonators and one or more target resonators which generate and capture induced magnetic field. Each source resonator is attached to the main battery that charges other subsystems, while each target resonator is attached to the subsystem.

Further, in at least one embodiment, the subsystem does not feature its own battery, but rather is powered by the main battery 104 of the ROV, and receives that power wirelessly through a power receiver resonator. An example embodiment showing a subsystem powered by the main battery of the ROV is shown at FIG. 4. In this embodiment, the main power transmitter 180 of the ROV (shown in FIG. 1) is configured to wirelessly transfer power from the battery 104 to the subsystem 202 via a power receiver (e.g., a subsystem tool 260) located within the subsystem 202. More specifically, the magnetic induction principle states that when two coils are placed in a mutual inductive coupling state, as electrical current changes in the first coil, an electromotive force is induced in the second coil. In the described embodiment, the main battery 104 of the ROV is attached to an inductive source resonator, which alters the electrical current passing in its coil (the first coil) in order to generate magnetic field. In turn, this induces an electromotive force in the capturing coil (second coil) of the target resonator attached to the subsystem. As such, as electrical current changes in the source resonator, an electromotive force is induced in the target resonator, thereby allowing the transfer of power to the subsystem.

In at least one embodiment, at least one subsystem can be powered by the main battery 104 of the ROV using magnetic resonance coupling methods. For example as shown in FIG. 2A, in one or more embodiments the ROV 102 can further comprise a series resonator 190 mounted within the main hull 103. The series resonator 190 can selectively feed power to certain subsystems and can switch on and off for certain subsystems according to the operating mode. In this embodiment, upon receiving a signal from the subsystem 202 regarding the level of battery 204, the series resonator 190 can be configured to selectively feed power to the subsystem 202 (if the signal indicates its battery is low) via power transmitter 180. Further, in an embodiment in which there are multiple subsystems 202 operatively connected to an ROV 102, each subsystem 202 can have its own specific resonant frequency that it's coupled to. As such, upon receiving a signal from a particular subsystem having a particular resonance frequency, the series resonator 190 is configured to selectively transfer power to a particular subsystem (via power transmitter 180) based on the resonance frequency of the signal. Magnetic coupling methods can also provide additional advantages for the systems of the present application. For example, in one or more embodiments, the use of magnetic coupling methods for thruster subsystems can enhance the depth rating of the ROV. Magnetic coupling for powering eliminates the need for wired power transfer between the main hull 103 of the ROV 102 and the subsystems 202, and thus enables the main hull 103 to be constructed free of connector holes that otherwise are needed to accommodate the power wires. As such, without connector holes in the main hull 103, the depth rating of the ROV 102 is enhanced (i.e., the ROV of this construction can submerge to greater depths than an ROV that has power wires extending through holes in its hull). In an exemplary embodiment, wireless power transfer between the ROV 102 and one or more subsystems 202 can be accomplished using Highly Resonant Wireless Power Transfer (HR-WPT) methods, which in certain implementations can transfer at least 3.3 KW of power over a distance of approximately 15 cm of salt water.

In one or more embodiments, the battery 204 of a subsystem 202 is charged through a sealed closed connector, which can be opened during charging only. In at least one embodiment, a subsystem can transfer power (and/or data) to other subsystems thereby creating a mesh network and extending the range of power transfer beyond the maximum distance that power can be transmitted from the main hull 103.

As mentioned above in reference to FIG. 1, in one or more embodiments, the system 100 can further comprise one or more power transfer repeaters 502 to extend the range of power transmission from the power transmitter 180 of the ROV 102 (or outside power source) to the battery 204 (or power receiver resonator) of the subsystem(s) 202. In one or more embodiments, the power transfer repeater(s) 502 are simple modules enclosed within sealed housings and located at various distances around the ROV 102. For example, the one or more power transfer repeaters 502 can be located in between the ROV and a subsystem, such that a power transmission sent from the ROV is first received by the power transfer repeater(s) and then transmitted (forwarded) from the repeater to the subsystem. In at least one embodiment, a power transmission originating from the ROV 102 can be "relayed" or "repeated" between multiple repeaters 502 until it reaches the subsystem 202. As such, the power transfer repeaters 502 allow the ROV 102 and a subsystem 202 to be a greater total distance away from one another because the power transmission only has to travel a series short distances between the ROV and each repeater before reaching the subsystem 202, rather than travelling one, longer distance directly from the ROV to the subsystem. Thus, in one or more embodiments, the power transfer repeaters 502 can bridge the power transmission distance between the ROV and subsystems (or between another outside power source and subsystems), thus allowing them to be greater distances from one another, but still allow for reliable power transmission.

In embodiments in which each subsystem has its own individual battery 204, operation of the subsystem can result in the battery 204 generating excess heat, which can be damaging to the subsystem's electronics. As such, in at least one embodiment, the subsystem housing 203 can be filled with non-conductive and non-compressible oil, which helps to dissipate the heat generated by the battery 204. In one or more embodiments, the oil is mineral oil.

Control Center

As mentioned above, in one or more embodiments, the system 100 can include a control center 302. In one or more embodiments, the control center 302 can be a land based station or can be another sea vessel. The control center 302 can be configured to control operation of the ROV 102 and/or subsystems 202 using control signals that are communicated between the control center and the ROV and/or subsystem. The control center can include at least one transmitter-receiver for transmitting and receiving signals (e.g., control signals), as well as for transmitting and receiving data. In one or more embodiments, the one or more transmitter-receivers can be transceivers or can be separate transmitters and receivers. In one more embodiments, signals and/or data can be transmitted between the control center 302 and the ROV (or subsystems) via the relay modules 402.

In one or more embodiments, the control center 302 can include one or more computing devices, which can have the same or similar operations and features as the microcontroller 106 and/or subsystem controller 206 as described above. For example, the one or more computing devices of the control center 302 can have various hardware and software components that serve to enable various operations of the control center 302, ROV(s) 102, and/or subsystem(s) 202. These various hardware and software components can comprise one or more hardware processors, and a memory and/or storage accessible by the processor. The processor serves to execute software instructions that can be loaded into the memory/storage. More specifically, one or more software modules can be encoded in the storage and/or in the memory. The software modules can comprise one or more software programs or applications having computer program code or a set of instructions executed in the processor. In certain embodiments, the control center 302 can also include a joystick for controlling the movement and operations of the ROV 102 and/or the subsystems 202.

It should be understood that although much of the foregoing description has been directed to systems and methods for wirelessly controlled subsystems for underwater remotely operated vehicles, the system and methods disclosed herein can be similarly deployed and/or implemented in scenarios, situations, and settings far beyond the referenced scenarios. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A system for underwater remotely operated vehicles (ROVs) and wirelessly controlled subsystems, comprising:
   an ROV comprising a main hull, a microcontroller, a main battery, and at least one ROV transmitter-receiver, wherein the main hull encloses the microcontroller, the main battery, and the at least one ROV transmitter-receiver;
   a self-powered subsystem mounted to the main hull without the use of a tether, the subsystem comprising a housing, a controller, a battery, and at least one subsystem transmitter-receiver, wherein the housing encloses the controller, the battery, and the at least one subsystem transmitter-receiver; and
   wherein the ROV is configured to communicate wirelessly with the self-powered subsystem via signals transmitted between the at least one ROV transmitter-receiver, and the at least one subsystem transmitter receiver, and wherein the ROV and the self-powered subsystem are free of openings and tether-less.

2. The system of claim 1, further comprising:
   a second self-powered subsystem, wherein the second self-powered subsystem comprises a housing that encloses a controller, a battery, and at least one subsystem transmitter-receiver.

3. The system of claim 2, wherein the ROV further comprises a reed switch configured to control each of the batteries of the self-powered subsystems.

4. The system of claim 3, wherein the reed switch is controlled via application of an electric field.

5. The system of claim 2, wherein the ROV further comprises a third subsystem, and a series resonator enclosed within the main hull, the series resonator being configured to selectively feed power to the third subsystem via magnetic resonance coupling.

6. The system of claim 2, wherein the self-powered subsystems each comprise at least one subsystem tool.

7. The system of claim 6, wherein the at least one subsystem tool includes at least one of a thruster, light flash, sonar, camera, servos, DC motor, linear actuator, robotic arm, joint, ultrasonic thickness testing probe, and/or cathodic protection probe, sensor, inspection tool, maintenance tool and any combination thereof.

8. The system of claim 1, wherein the ROV is configured to wirelessly transfer power from the main battery to the battery of the self-powered subsystem.

9. The system of claim 8, wherein the ROV further comprises a power transmitter configured to wirelessly transfer power from the main battery to the battery of the self-powered subsystem.

10. The system of claim 1, further comprising:
    one or more power transfer repeaters configured to relay power from the main battery to the battery of the self-powered subsystem.

11. The system of claim 2, further comprising a control center comprising at least one station transmitter-receiver, wherein the control center is configured to communicate wirelessly with the ROV and each of the self-powered subsystems via signals between the at least one station transmitter-receiver, the at least one ROV transmitter-receiver, and each of the at least one subsystem transmitter-receivers.

12. The system of claim 11, wherein the control center is configured to control the operation of the ROV and each of the self-powered subsystems via control signals between the at least one station transmitter-receiver, the at least one ROV transmitter-receiver, and each of the subsystem transmitter-receivers.

13. The system of claim 1, further comprising:
    at least one relay module configured to relay the signals between the ROV transmitter-receiver and the at least one subsystem transmitter receiver.

14. The system of claim 5, wherein the third subsystem further comprises a power receiver resonator.

15. The system of claim 14, wherein the ROV is configured to wirelessly transfer power from the main battery to the third subsystem via the power receiver resonator.

16. The system of claim 15, wherein the ROV further comprises a power transmitter configured to wirelessly transfer power from the main battery to the third subsystem via the power receiver resonator.

17. The system of claim 16, wherein the power transmitter is configured to wirelessly transfer power from the main battery to the third subsystem via the power receiver resonator using magnetic induction methods.

18. The system of claim 1, wherein the at least one ROV transmitter-receiver comprises an omni-directional antenna.

19. The system of claim 1, wherein the at least one subsystem transmitter-receiver comprises a directional antenna.

20. The system of claim 1, wherein the signals transmitted between the at least one ROV transmitter-receiver and the at least one subsystem transmitter-receiver are data signals and command signals.

21. The system of claim 20, wherein the data signals and command signals are low frequency RF signals.

22. The system of claim 20, wherein the data signals and command signals are acoustic signals.

23. The system of claim 20, wherein the data signals and command signals are optical signals.

* * * * *